United States Patent
Porter et al.

(10) Patent No.: US 12,126,469 B2
(45) Date of Patent: Oct. 22, 2024

(54) DISTRIBUTED OUTPUT STAGES WITH T-COILS

(71) Applicant: SEMTECH CORPORATION, Camarillo, CA (US)

(72) Inventors: Steven Greig Porter, Ottawa (CA); Stanley Jeh-Chun Ma, Ottawa (CA)

(73) Assignee: SEMTECH CORPORATION, Camarillo, CA (US)

( * ) Notice: Subject to any disclaimer, the term of this patent is extended or adjusted under 35 U.S.C. 154(b) by 210 days.

(21) Appl. No.: 17/956,748

(22) Filed: Sep. 29, 2022

(65) Prior Publication Data
US 2024/0113920 A1    Apr. 4, 2024

(51) Int. Cl.
H04L 25/02    (2006.01)

(52) U.S. Cl.
CPC ........ *H04L 25/0272* (2013.01); *H04L 25/028* (2013.01); *H04L 25/0292* (2013.01)

(58) Field of Classification Search
CPC .................................................. H04L 25/0272
USPC ......................................................... 327/110
See application file for complete search history.

(56) References Cited

U.S. PATENT DOCUMENTS

| | | | |
|---|---|---|---|
| 2004/0145380 A1* | 7/2004 | Babcock .......... | G01R 31/31924 324/750.3 |
| 2018/0366898 A1* | 12/2018 | Abdelhalim .............. | H01S 3/09 |
| 2019/0041896 A1* | 2/2019 | Wong ........................ | G06F 1/04 |

OTHER PUBLICATIONS

B. Razavi, "The Bridged T-Coil [A Circuit for All Seasons]," in IEEE Solid-State Circuits Magazine, vol. 7, No. 4, pp. 9-13, Fall 2015, doi: 10.1109/MSSC.2015.2474258.

E. L. Ginzton, W. R. Hewlett, J. H. Jasberg and J. D. Noe, "Distributed Amplification," in Proceedings of the IRE, vol. 36, No. 8, pp. 956-969, Aug. 1948, doi: 10.1109/JRPROC.1948.231624.

\* cited by examiner

*Primary Examiner* — Tomi Skibinski
(74) *Attorney, Agent, or Firm* — Morgan, Lewis & Bockius LLP

(57) ABSTRACT

A signal driver may include a plurality of distributed drivers along a differential transmission line. Each of the plurality of the distributed drivers may include: an output tap configured to receive a portion of an incoming signal of the signal driver; and a T-coil connected to an output node of the output tap. The differential transmission line is connected to and intercepted by a first terminal and a second terminal of the T-coil, and a plurality of T-coils of the plurality of the distributed drivers are distributed along and spaced apart on the differential transmission line.

20 Claims, 6 Drawing Sheets

DISTRIBUTED OUTPUT STAGES WITH T-COILS

BACKGROUND

A signal driver often includes multiple output stages to process incoming signals for a load. Connecting the multiple output stages together at one output node may result in large parasitic capacitance on the output, degraded high frequency response, and output return loss. Such implementations suffer from a limited bandwidth and increased return loss at high frequencies.

In a signal driver, achieving sufficient inductance to mitigate the driver output capacitance has been problematic. In some approaches, routing is made thinner to increase the inductance, which may compromise the direct current (DC) resistance and electromigration in the transmission line. For example, electromigration may be acceptable only up to a certain temperature, and DC resistance affects the impedance matching and loss. In some approaches, shunt resistors are added to maintain the impedance matching which requires additional routing in the signal driver and increases power consumption. For data communications where a significantly wide bandwidth is required, improved signal drivers are needed.

The description provided in the background section should not be assumed to be prior art merely because it is mentioned in or associated with the background section. The background section may include information that describes one or more aspects of the subject technology, and the description in this section does not limit the invention.

BRIEF DESCRIPTION OF THE DRAWINGS

The accompanying drawings, which are included to provide a further understanding of the disclosure, are incorporated in and constitute a part of this disclosure, illustrate embodiments of the disclosure, and together with the description serve to explain principles of the disclosure.

Figure 1:
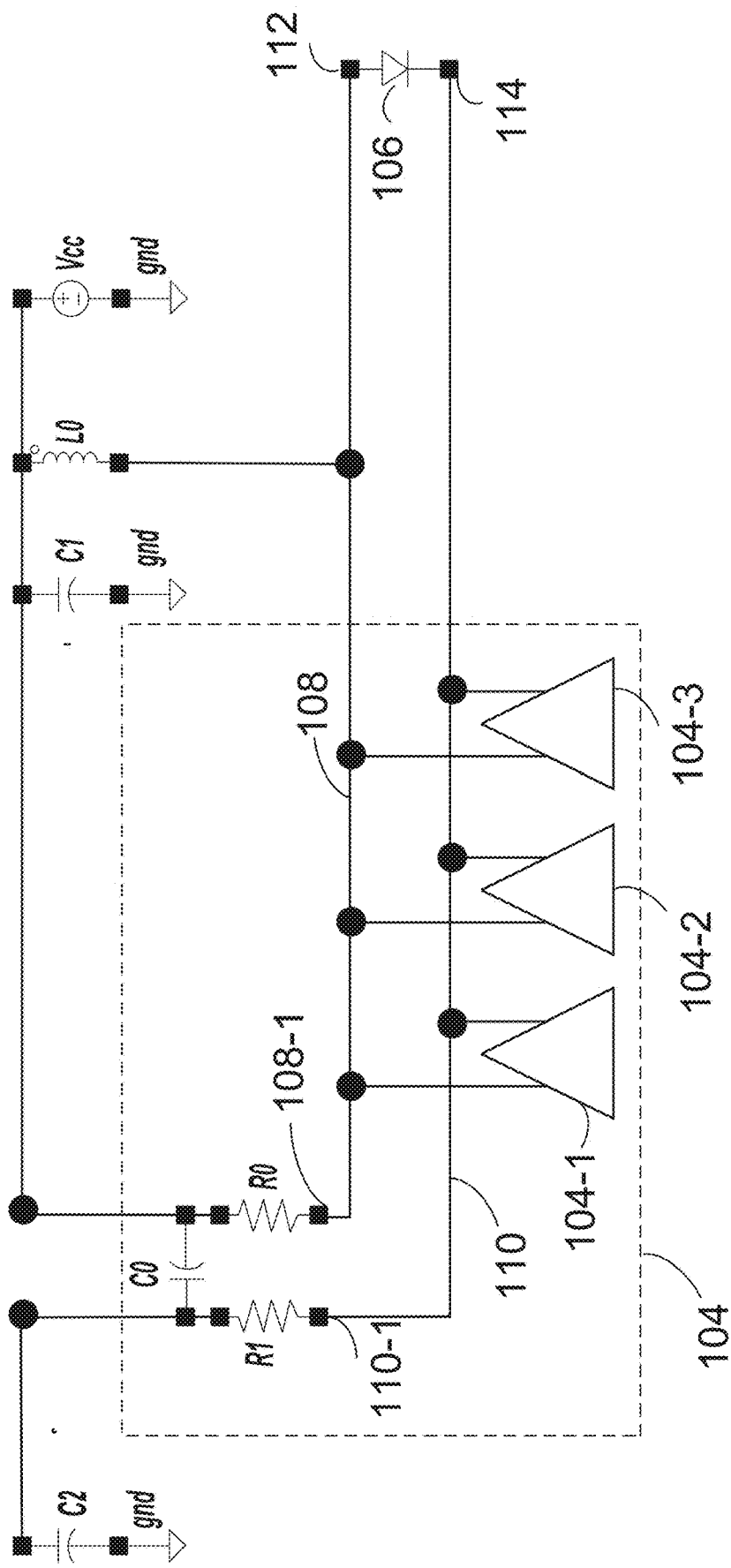
FIG. 1. illustrates a diagram of an example signal driver with distributed drivers along a transmission line.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The present description relates to semiconductor integrated circuits, including, without limitation, a distributed output stage with T-coils to improve bandwidth and return loss.

In one or more aspects, a current steering digital to analog converter (DAC) may be implemented with a distributed output stage to improve bandwidth and return loss. Current steering DACs typically have a large number of output stages all connected to a common output node which may result in large parasitic capacitance. In one or more aspects, by distributing the output stages along a transmission line, the impact of the parasitic capacitance may be reduced, extending the bandwidth and return loss of the DACs. Furthermore, tee-coils (T-coils), which may include coupled inductors, may be added to the current steering DAC output stages to mitigate the parasitic effects (e.g., parasitic capacitance) of the output stage which may further improve bandwidth and reduce return loss.

In one or more implementations, one end of each of the two inductors of a T-coil may be connected together to the output stage parasitic capacitance. A transmission line may be cut so the other ends of the two inductors may connect separately to the transmission line on either side of the cut opening. A capacitor may be formed or implemented between the coupled inductors that straddle the transmission line cut. The T-coil implementation contributes to the high frequency response improvement.

The present implementation disclosed herein may be applied in various applications in addition to DACs, such as output drivers for various applications, including laser drivers, or other drivers that may require equalization and/or output wave shaping.

In one or more aspects, distributing the output stages with T-coils may greatly improve the performance by increasing the bandwidth. In one or more aspects, the implementation of the subject technology shows advantages over other bandwidth extension and parasitic mitigation techniques. In one or more aspects, the implementation of the subject technology improves the return loss at high frequencies.

FIG. 1 illustrates a diagram of an example signal driver with distributed drivers along a transmission line.

In some approaches, all the output nodes of a signal driver may be connected at one point, which may introduce large capacitance. In one or more aspects, the term "distributed" may mean instead of connecting all the output nodes from various output taps to one point, the output nodes are distributed along a transmission line, so that output nodes may be connected at different points along the transmission line.

As shown in FIG. 1, a signal driver 104 may include a plurality of distributed drivers 104-1, 104-2, and 104-3. The plurality of distributed drivers may be more than the three distributed drivers shown in FIG. 1. The plurality of distributed drivers 104-1, 104-2, and 104-3 may be distributed along and connected to a transmission line 108 which may be connected to an anode node 112 on an anode side of a load 106. In some examples, the load 106 may be a directly modulated laser (DML). In one or more examples, a transmission line may be a metal line or metal strip on a chip. The plurality of distributed drivers 104-1, 104-2, and 104-3 may also be distributed along and connected to a transmission line 110 which may be connected to a cathode node 114 on a cathode side of the load 106. The output signals from the plurality of distributed drivers 104-1, 104-2, and 104-3 may be summed along the transmission lines 108 and 110, respectively. The two transmission lines 108 and 110 may provide differential outputs. The signal driver 104 may be configured to transmit/receive signals from a data/signal transmission network to the load 106. The plurality of distributed drivers may be substantially similar in structure and function for each of the transmission lines 108 and 110.

In some aspects, the distributed drivers shown in FIG. 1 may mitigate the effect of driver output capacitance. In one or more aspects, the signal driver 104 may need to drive one or more output devices as the load 106 uses one or more output stages (not shown in FIG. 1). Those output stages may require a large amount of power and may also introduce parasitic capacitance at the input nodes and output nodes of the output stages. The introduced parasitic capacitance may reduce the bandwidth and increase the loss of the transmission data. In one or more improved aspects as shown in FIG. 1, the one or more output stages may be separated into a plurality of distributed drivers 104-1, 104-2, 104-3, and so on, distributed along the transmission lines 108 and 110 to reduce the capacitance per distributed driver. In some examples, inductance may also be introduced to combine with the capacitance on the distributed drivers to form an inductor-capacitor filter (LC filter) for each of the distributed drivers (not shown in FIG. 1). However, such LC filters may have a deteriorated response at high frequencies. As the signal passes through the transmission lines, the signal on the high frequency range may be lost during the transmission.

In one or more implementations, the signal driver 104 may include termination resistors R0 and R1 and a capacitor C0. In one or more examples, one end 108-1 of the transmission line 108 opposite to the anode node 112 may be coupled to a supply voltage Vcc through the termination resistor R0. The supply voltage Vcc may be a direct current (DC) bias voltage. In some examples, a ferrite L0 may also be connected to the supply voltage Vcc and to the anode node 112. A capacitor may be connected to the supply voltage Vcc and to the ground (gnd). In one or more examples, one end 110-1 of the transmission line 110 opposite to the cathode node 114 may be coupled to the ground through the termination resistor R1 and a capacitor C2. The capacitor C0 may be connected between two end nodes of the termination resistor R0 and the termination resistor R1, and the two end nodes are on the opposite side of the ends 108-1 and 110-1, respectively. The signal driver 104 may be manufactured on a die.

Figure 2A:
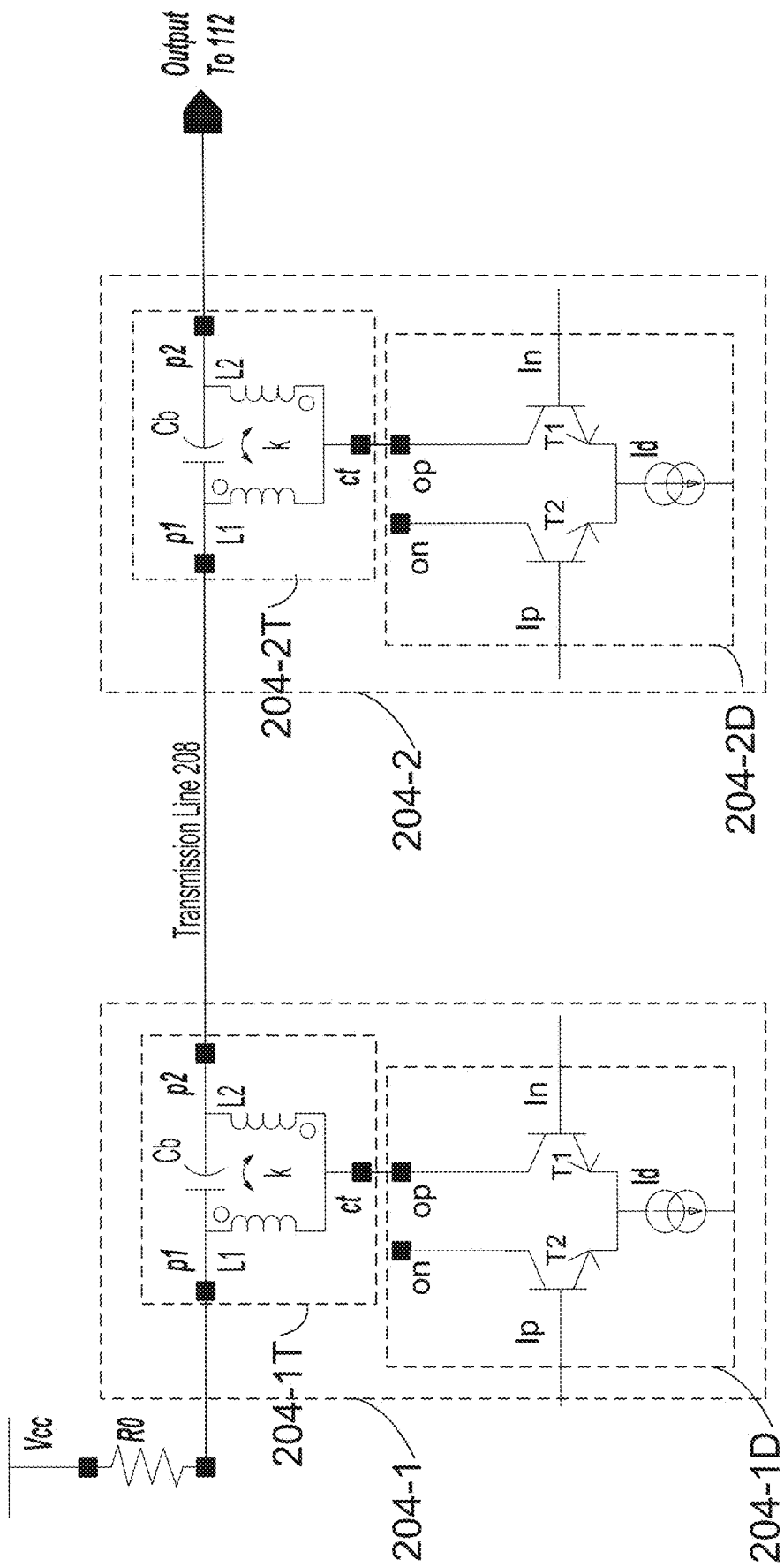
FIGS. 2A and 2B illustrate circuit diagrams of an example signal driver implemented with T-coils at each of the distributed drivers.
Figure 2B:
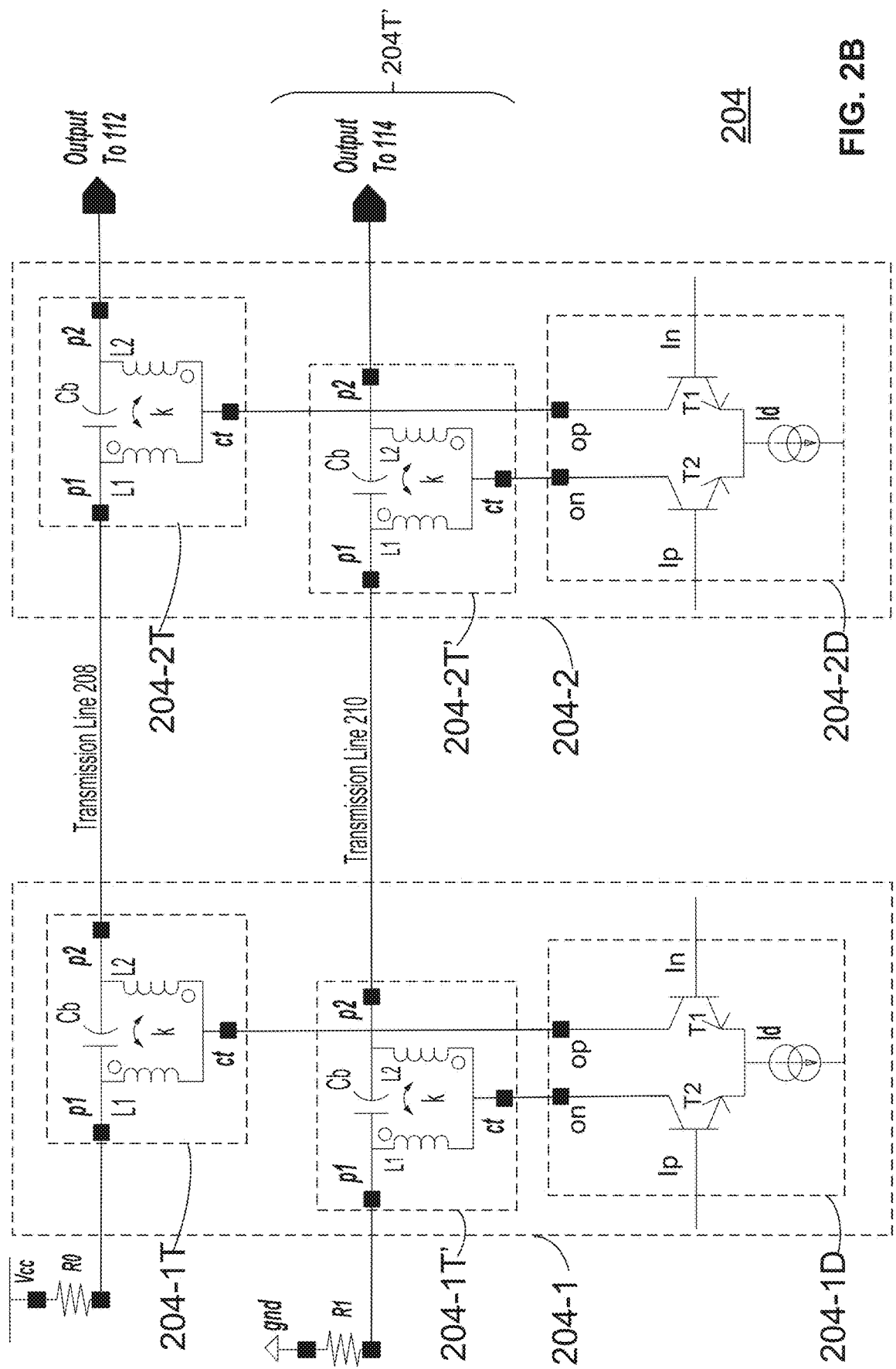

FIGS. 2A and 2B illustrate circuit diagrams of an example signal driver implemented with T-coils at each of the distributed drivers. FIG. 2B is the same as FIG. 2A, except that FIG. 2B illustrates additional components shown in the area identified as 204T'. These additional components in the area of 204T' illustrate T-coils 204-1T' and 204-2T', a transmission line 210, the termination resistor R1, the ground, and the output to 114.

In one or more aspects, the distributed drivers and the T-coil implementation added to the distributed drivers both improve the system performance and reduce the return loss.

Referring to FIG. 2A, the signal driver 204 may represent a portion of a detailed structure for the signal driver 104 in FIG. 1. The distributed driver 204-1 may include a digital to analog converter (DAC) 204-1D and a T-coil 204-1T. The distributed driver 204-2 may include a digital to analog converter (DAC) 204-2D and a T-coil 204-2T. Each of the distributed drivers 204-1, 204-2, 204-3 (not shown), and so on, included in the signal driver 204 may have substantially the same or similar structure as the distributed driver 104-1.

The T-coil 204-1T may have a three-terminal structure. The terminals may include a first terminal p1, a second terminal p2, and a center tap terminal ct (e.g., an output stage node). The terms terminal, port or/and node may be used interchangeably. In some examples, the T-coil 204-1T may include an inductor that is center-tapped that includes a first inductor portion L1 and a second inductor portion L2. In some examples, the T-coil 204-1T may include two inductors L1 and L2 that are connected with a center tap. In some examples, the two inductors L1 and L2 may overlap to allow a compact layout. The terms inductors L1 and L2, and inductor portions L1 and L2 may be used interchangeably herein. The T-coil 204-1T may include a bridge capacitor Cb, which may be formed due to electrical coupling between two inductors L1 and L2 (at the first and second terminals p1 and p2, respectively) of the T-coil 204-1T. In some examples, the bridge capacitor Cb may be a parasitic capacitor formed by the electrical coupling of L1 and L2. In some examples, the bridge capacitor Cb may be an explicitly implemented capacitor with specific capacitance (e.g., extrinsic capacitance rather than intrinsic capacitance). In one or more examples, L1 and L2 may be designed so that the parasitic capacitance Cb between the L1 and L2 is in a desired value. The dimensions of the metal of L1 and L2 may determine the suitable Cb capacitance. In case when no large enough parasitic capacitance (or intrinsic capacitance) is created between the L1 and L2, an actual bridge capacitor Cb may need to be added explicitly.

In some examples, the inductance of the inductors L1 and L2 may be substantially the same. In some examples, the inductance of the inductors L1 and L2 may be different and optimized independently. The T-coil characteristics may depend on the values of the inductances of inductors L1, L2, and the coupling coefficient k between the inductors L1 and L2, which may be based at least in part on the layout and shape of the T-coil. In some examples, the coupling coefficient k may be about 0.4 due to the physical implementation limitations on a chip. In some examples, the coupling coefficient k may be higher than 0.4 in other applications. In some examples, k is greater than 0 and less than 1. The value of k may be optimized to achieve the desired return loss and frequency response with a value around 0.3 to 0.7. In some implementations, the values of the inductors L1 and L2 are within a range of about 10 to 1000 pico-Henry (pH), and the value of the bridge capacitor Cb is within a range of about 1-200 femto-Farad (fF).

Simplified equations for an ideal T-coil component values may be as follows:

$$L1=L2=1/(1+k)*Cp*Zo^2,$$

$$Cb=0.25*(1-k)/(1+k)*Cp$$

wherein Cb is the parasitic capacitance of the bridge capacitor Cb; L1 and L2 are the inductances of the inductors L1 and L2 respectively; Cp is the capacitance on the center tap terminal ct; k is the inductor coupling coefficient; and Zo is the transmission line impedance which may be often dictated by an application requirement.

L1, L2 and Cb may change based on the capacitance Cp on the center tap terminal ct, which may be the (parasitic) capacitance of the DAC. The capacitance of a distributed driver may be based on the size of the distributed driver devices. The inductance of L1 or L2 may be determined partially by the coupling coefficient k. The higher the coupling coefficient k, the less the inductance of L1 or L2 needed to achieve an implementation requirement.

In one or more examples, each of the T-coils may be placed close to the parasitic capacitance of the DAC or a corresponding output tab (e.g., 204-1D, or 204-2D) to minimize the parasitic inductance between the center tap terminal ct of the T-coil and the transistors within the corresponding output tab (e.g., transistors T1 and T2). In one or more examples, L1 and L2 of each of the T-coils may need to be located close to a final output node (e.g., node 112 or 114; or close to node 112 or 114) of the signal driver 204. In some examples, the inductance of L1 or L2 may be implemented with a straight-line track, or with a looped coil although other implementations are possible.

In one or more examples, the direct current (DC) resistance through the T-coils may be minimized to reduce loss. In some examples, adding more T-coils to the signal driver may increase the parasitic capacitance. In such a situation, the inductance may need to be increased to compensate for the increased parasitic capacitance.

In one or more examples, if two T-coils of two distributed drivers, for example, T-coils 204-1T and 204-2T are too close to each other, parasitic capacitance may be formed between the two T-coils. Therefore, a limitation of the spacing between the adjacent T-coils may be considered in an implementation. A layout such as the one illustrated in FIG. 4 may be used to reduce the parasitic capacitance between the adjacent T-coils. Given the constraints on a chip (or constraints on the space and layout of a chip), maximization of distance between the terminal p2 of a T-coil (e.g., 204-1T) and the terminal p1 of an adjacent T-coil (e.g., 204-2T) may be needed. In one or more implementations, the parasitic capacitance between p2 of a T-coil (e.g., 204-1T) and p1 of an adjacent T-coil (e.g., 204-2T) may be about or less than 1/10 of the bridge capacitance Cb of each of the T-coil or the adjacent T-coil. In some examples, the distance between adjacent T-coils of the distributed drivers is fixed.

The DAC 204-1D may be an output stage of the distributed drivers 204-1. The DAC 204-1D may include a current source Id. In one or more aspects, a current source (e.g., Id) may be sometimes referred to as a current sink and vice versa. The DAC 204-1D may include two transistors T1 and T2. Through the T-coil 204-1T, T1 may be coupled to a transmission line 208. In some examples, the transmission line 208 may be a transmission line 108 in FIG. 1 connected to an anode node 112 on an anode side of a load 106, and to a DC bias voltage Vcc through a termination resistor R0. Similarly, through the T-coil 204-1T' of FIG. 2B, T2 may be coupled to the transmission line 210 of FIG. 2B. In some examples, the transmission line 210 of FIG. 2B may be a transmission line 110 in FIG. 1 connected to a cathode node 114 on a cathode side of a load 106, and to the ground through a termination resistor R1. The plurality of distributed drivers with T-coils may be substantially similar in structure and function for each of the transmission lines 108 and 110 to form a differential output. For simplicity, FIG. 2A illustrates only one transmission line 208. On the other hand, FIG. 2B illustrates both transmission lines 208 and 210. T1 and T2 may be negative-positive-negative (NPN) bipolar transistors or N-type metal-oxide-semiconductor (NMOS) transistors. T1 may be controlled by an input signal In and T2 may be controlled by an input signal Ip. In other implementations, T1 and T2 may be positive-negative-positive (PNP) bipolar transistors or P-type metal-oxide-semiconductor (PMOS) transistors. In some examples, Ip may be an inverted signal of In.

An output node op of the transistor T1 may be connected to the T-coil 204-1T through the center tap terminal ct. The T-coil 204-1T may be connected to the transmission line 208 through the first terminal p1 and the second terminal p2.

An output node on of the transistor T2 may be connected to the T-coil 204-1T' of FIG. 2B through the center tap terminal ct. The T-coil 204-1T' may be connected to the transmission line 210 through the first terminal p1 and the second terminal p2.

The transmission line 208 may be segmented by each of the T-coils (e.g., T-coils 204-1T and 204-2T). For example, some portions of the transmission line 208 may be fully occupied by the T-coils. The connections of the first terminal p1 and the second p2 may be interchangeable when the inductances of L1 and L2 are the same. The output signals of the distributed drivers 204-1, 204-2, and so on of FIGS. 2A and 2B may be summed as shown in FIG. 1 (in a manner similar to the distributed drivers 104-1, 104-2, and so on of FIG. 1) to be provided to the load 106. The signals from the transmission line 208 may be provided to each of the T-coils 204-1T and 204-2T through one inductor L1, through the capacitance Cb, and then through another inductor L2. In one or more advantageous examples, the inductances of L1 and L2 of a T-coil (or each of the T-coils) are the same. In such a situation, the input impedance and the output impedance of the T-coil are the same. In some examples, the inductances of L1 and L2 of a T-coil may be different.

Similar to the transmission line 208, the transmission line 210 of FIG. 2B may be segmented by each of the T-coils (e.g., T-coils 204-1T' and 204-2T'). For example, some portions of the transmission line 210 of FIG. 2B may be fully occupied by the T-coils. The connections of the first terminal p1 and the second p2 may be interchangeable when the inductances of L1 and L2 are the same. The output signals of the distributed drivers 204-1, 204-2, and so on of FIGS. 2A and 2B may be summed as shown in FIG. 1 (in a manner similar to the distributed drivers 104-1, 104-2, and so on of FIG. 1) to be provided to the load 106. The signals from the transmission line 210 of FIG. 2B may be provided to each of the T-coils 204-1T' and 204-2T' through one inductor L1, through the capacitance Cb, and then through another inductor L2. In one or more advantageous examples, the inductances of L1 and L2 of a T-coil (or each of the T-coils) are the same. In such a situation, the input impedance and the output impedance of the T-coil are the same. In some examples, the inductances of L1 and L2 of a T-coil may be different.

The signal driver 204 including the distributed drivers with T-coils may achieve a consistent/flat frequency response for a broad range of frequencies. As a signal passes through the transmission line 208, in an ideal situation when the transmission line has no resistance, there may be no filtering effect from the T-coils and no loss on the signal, especially, at a high frequency range (e.g., a range close to 10 GHz to 30 GHz) during the transmission. The high frequency range may be different depending on a particular application requirement. At the same time, the bandwidth of the signal may be improved by the distributed drivers with T-coil implementations. In a practical case, the signals that travel through the transmission line may experience minor attenuation, e.g., a loss of 0.001% to 5%.

In one or more aspects, the same input signals may be provided to each of the distributed drivers 204-1, 204-2, and so on, and each of the distributed drivers 204-1, 204-2, and so on may have the same size (e.g., same T-coil size and parameter). In one or more aspects, different input signals may be provided to each of the distributed drivers 204-1, 204-2, and so on, and each of the distributed drivers 204-1, 204-2, and so on may have different sizes (e.g., different T-coil size and parameter). In one or more examples, the distributed drivers 204-1, 204-2, and so on may be binary weighted as shown further in FIG. 3.

Referring to FIGS. 2A and 2B, in one or more examples, the structures and functions of the T-coils (e.g., 204-1T, 204-2T, 204-1T', and 204-2T') may be substantially the same or similar. In one or more examples, the structures and functions of DACs (e.g., 204-1D and 204-2D) may be substantially the same or similar. In one or more examples, the structures and functions of the transmission lines (e.g., 208 and 210) may be substantially the same or similar except for their respective connections to other components (e.g., R0 vs. R1; Vcc vs. the ground; output to 112 vs. output to 114; 204-1T/204-2T vs. 204-1T'/204-2T'). These are examples, and the subject technology is not limited thereto.

Figure 3:
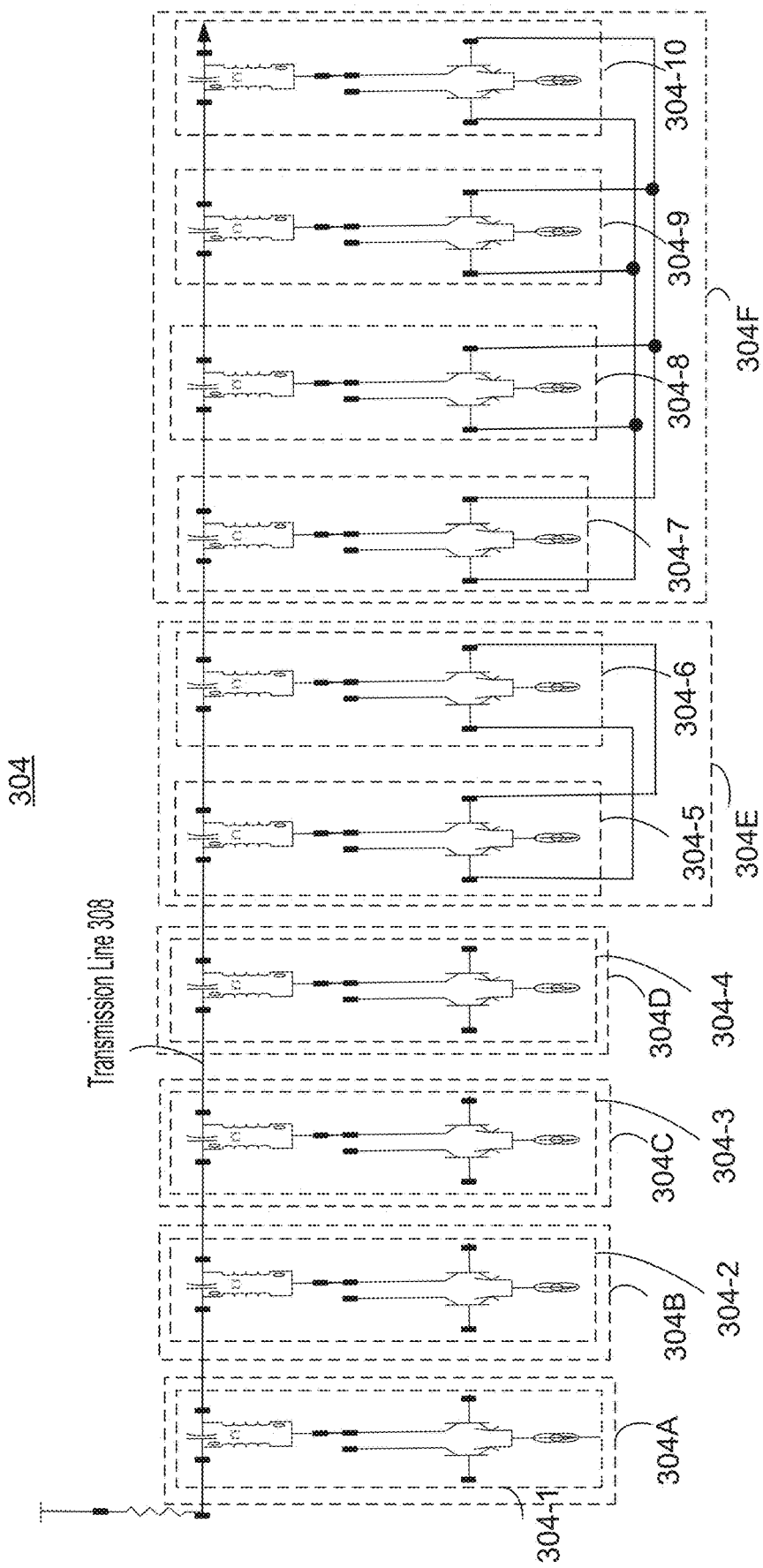
FIG. 3 illustrates an example signal driver diagram including distributed output stages with different sizes.

FIG. 3 illustrates an example signal driver including distributed output stages with different sizes.

Each of the output stages may include one or more distributed drivers implemented with T-coils. Each of the distributed drivers implemented with T-coils shown in FIG. 3 may have substantially the same or similar structure, functionality, and connection to the transmission line 308 as each of the distributed drivers implemented with T-coils shown in FIGS. 2A and 2B, such as the distributed driver 204-1 including a DAC 204-1D and T-coils 204-1T and 204-1T'.

The signal driver 304 may include a plurality of output stages, for example, six output stages 304A, 304B, 304C, 304D, 304E, and 304F, as shown in FIG. 3. Each of the plurality of output stages may be configured to receive an input signal for a single bit of a N bit string/symbol. For example, when N=6, 6 output stages as shown in FIG. 3 may be needed to process the 6 bit symbol in the bit stream. The signal driver 304 may be expanded or reduced to include any size of output stages. Each of the output stages may have different sizes. Some T-coils may have smaller capacitances, and some T-coils may have larger capacitances. Larger inductances of L1 and L2 of a T-coil may result in larger T-coil capacitance.

In one or more examples herein, N× T-coil may refer to a T-coil that has N times the inductance and capacitance, respectively, of a 1× T-coil, but with the same coupling coefficient k. N× distributed driver may refer to a distributed driver that has N times the output signal, and thus, correspondingly, N times the output capacitance. Bit 0 to bit 5 are the binary weighted inputs of a 6 bit symbol for the DACs in the signal driver 304. In one or more aspects, N may be a natural number.

In FIG. 3, the output stage 304A may include one distributed driver 304-1 with a 1× T-coil. The distributed driver 304-1 may be a 1× output distributed driver with an input bit 0. The output stage 304B may include one distributed driver 304-2 with a 2× T-coil. The distributed driver 304-2 may be a 2× distributed driver with an input bit 1. The output stage 304C may include one distributed driver 304-3 with a 4× T-coil. The distributed driver 304-3 may be a 4× distributed driver with an input bit 2. The output stage 304D may include one distributed driver 304-4 with an 8× T-coil. The distributed driver 304-4 may be an 8× output stage with an input bit 3. The output stage 304E may include two distributed drivers 304-5 and 304-6, each with an 8× T-coil. Each of the two distributed drivers 304-5 and 304-6 may be an 8× distributed driver with the same input bit 4. In some examples, the input nodes of each of the distributed drivers 304-5 and 304-6 may be connected together to receive the same input bit. The output stage 304F may include four distributed drivers 304-7, 304-8, 304-9, and 304-10, each with an 8× T-coil. Each of the four distributed drivers 304-7, 304-8, 304-9, and 304-10 may be an 8× distributed driver with the same input bit 5. In some examples, the input nodes of each of the distributed drivers 304-7, 304-8, 304-9, and 304-10 may be connected together to receive the same input bit.

In one or more examples, multiple distributed drivers/T-coils may be needed to process the same bit. When some bits represent a larger portion of the output signal, either a larger output stage, or multiple smaller output stages may be required to sum and provide the larger output signal. When an undesirable large output stage is implemented, the large output stage may have a large parasitic output capacitance and require a large T-coil inductance L1 and L2 which would result in a lower bandwidth. By implementing the more distributed, multiple smaller output stages, the parasitic output capacitance for each stage is smaller, requiring a smaller T-coil inductance L1 and L2 which results in a higher bandwidth. The higher bandwidth may be one of the advantages of distributing the output stages into multiple smaller sizes.

In FIG. 3, the inputs of the signal driver 304 may be multiple different portions/versions of the input signals in order to shape the output signals. By providing different input signals to these different output stages 304A, 304B, 304C, 304D, 304E, and 304F, the different signals may pass through the output stages and then all of the different signals may be summed along the transmission line 308 without any frequency filtering. Thus, a flat/consistent frequency response may be obtained, and the bandwidth of the output stages may be extended.

In one or more aspects, the different output stages of a signal driver may represent different signals that require a summing along the transmission line, such as three eyes of a pulse amplitude modulation 4-level (PAM4). In one or more aspects, the different output stages of a signal driver may be replaced with output stages of various sizes for programmable equalization taps with one or more output stages per tap.

In one or more aspects, the different stages with different sizes may be designed for different aspects of the wave shaping, such as equalization taps, precursors and/or post cursors (with or without DAC) for forming different equalization features. In one or more aspects, when the different stages with different sizes are implemented by the DACs, they may be binary weighted as shown in FIG. 3. By summing the output stages with T-coils, an improved frequency response may be achieved from each of the output stages to the final output stage, and a flat frequency response from one point (or one end) of the transmission line to another far point (or the other end) of the transmission line may be achieved. In other words, every point on the transmission line may have a similar frequency response from a first output stage (e.g., 304A) to the last output stage (e.g., 304F) in a mathematically ideal situation.

The summing of the output stages may be used in an equalizer to optimize the input or output signals. In case of a signal driver with a laser load, the laser may have a particular frequency response to the input signal. The signals may be pre-equalized before the signals reach the laser to compensate for the frequency response of the laser. For a current steering DAC, all the current from all the different binary weighted output stages may be summed.

FIG. 3 only illustrates one example of divided output stages and other division layouts are also possible. In one or more aspects, other variations of distributed drivers with different numbers/sizes may be implemented. The number of output stages or the number of distributed drivers included in the signal driver may be dependent on the number of bits of the input/output signal symbol or the configuration of the DACs to process the input/output signal symbol. Each of the output stages/distributed drivers may serve its different purpose in a signal driver. For example, for an 8-bit symbol processed by DACs of a signal driver, 8 to 13 distributed drivers may be needed depending on how the DACs are configured to process each bit. A large number of distributed drivers may be included in the signal driver, for example, up to 100 to 1000. Theoretically, the number of distributed drivers along the transmission line included in the signal driver may be unlimited. Generally, the larger the number of the distributed drivers included in the signal driver, the smaller the inductance and capacitance needed for each of the T-coils, and the higher the frequency response bandwidth achieved from the signal driver. Therefore, in one or more aspects, dividing the output stages with the T-coil implementation into a large number of output stages (e.g., as many as possible) may improve performance and bandwidth. Such division of the output stages (or attempting to have a large number of output stages) may be constrained by the space and layout of a chip of the signal driver.

Instead of one large output stage, small output stages may be distributed along the transmission line to improve bandwidth and reduce return loss. Instead of having one large output stage of a signal driver receiving input signals from 10 equalization taps at the same output node, in an advantageous example, the one large output stage may be divided into smaller output stages with T-coils distributed along a transmission line. For example, the one large output stage may be divided into 10 smaller output stages, and each of the smaller output stages may have ⅒ of the inductance and/or capacitance of the one large output stage. In some examples, each of the smaller output stages may correspond to one equalization tap. As a result, the net bandwidth of the signal driver may be 10 times higher after the division, because the parasitic capacitance at each output stage may be 10 times smaller than the parasitic capacitance of the one large output stage, which limits the net bandwidth. In some examples, an output stage of 2 DAC units with 2 T-coils may be divided into 10 DAC units and 10 T-coils along the transmission line.

In one or more examples, if one large output stage is divided into N smaller output stages with T-coils, the capacitance of the signal driver may become N times smaller than the original one large output stage implementation. In this regard, N may be a natural number. The bandwidth of the signal driver may become N times larger than the original one large output stage implementation. In some examples, in contrast to a bandwidth of about 300 MHz with one large output stage, a return loss of 30 decibel (dB) or greater may be achieved in the frequency range of above 11 GHz with an example implementation of 32 distributed drivers with T-coils along a transmission line. In some examples, a return loss of 30 dB or greater may be required to have an acceptable performance in a particular frequency range.

By dividing a large DAC unit into smaller DAC units, a higher bandwidth transfer function from the output of each stage to the transmission line may be achieved. Because T-coils are distributed on the transmission line instead of inductors, the bandwidth along the transmission line may be essentially infinite. Therefore, the performance of the signal driver may be improved, in particular on the high frequency attenuation.

Figure 4:
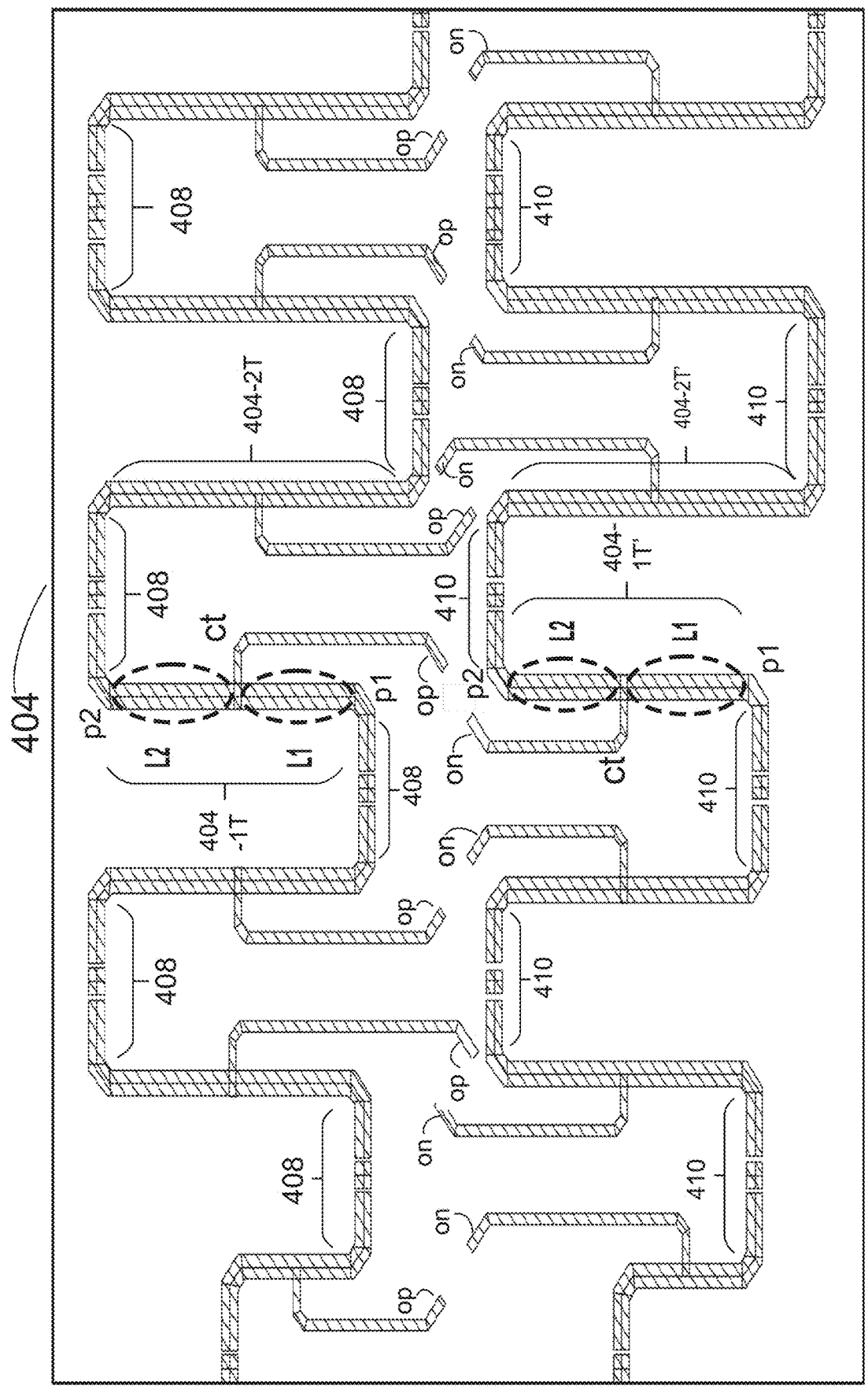
FIG. 4 illustrates a circuit layout diagram of an example portion of a signal driver.

FIG. 4 illustrates a circuit layout diagram of an example portion of a signal driver.

The portion of the signal driver 404 may have substantially the same or similar structure, functionality, and connection to a portion of the signal driver 204 in FIGS. 2A and 2B or the signal driver 304 in FIG. 3.

Referring to FIGS. 2A, 2B and 4, in some examples, the T-coil 204-1T of FIGS. 2A and 2B may represent a T-coil 404-1T of FIG. 4. The T-coil 204-2T of FIGS. 2A and 2B may represent a T-coil 404-2T of FIG. 4. The T-coil 204-1T' of FIG. 2B may represent a T-coil 404-1T' of FIG. 4. The T-coil 204-2T' of FIG. 2B may represent a T-coil 404-2T' of FIG. 4. The transmission line 208 of FIGS. 2A and 2B may represent a transmission line 408 of FIG. 4. The transmission line 210 of FIG. 2B may represent a transmission line 410 of FIG. 4. It should be noted that these are examples, and the T-coils 204-1T, 204-2T, 204-1T' and 204-2T' and the transmission lines 208 and 210 of FIGS. 2A and 2B may have structures that are different from those shown in FIG. 4.

Referring to FIG. 4, a plurality of T-coils including a T-coil 404-1T may be distributed along and connected to a transmission line 408 connected to an anode node (e.g., 112 in FIG. 1) on an anode side of a load (e.g., 106 in FIG. 1). A plurality of T-coils including a T-coil 404-1T' may be distributed along and connected to a transmission line 410 connected to a cathode node (e.g., 114 in FIG. 1) on a cathode side of the load (e.g., 106 in FIG. 1). The output signals from the plurality of T-coils may be summed along the transmission lines 408 and 410, respectively. The transmission lines 408 and 410 may form a differential output. The transmission line 408 may be segmented by each of the T-coils (e.g., 404-1T, 404-2T, and so on). Similarly, the transmission line 410 may be segmented by each of the T-coils (e.g., 404-1T', 404-2T', and so on).

Each of the T-coils includes the inductors L1 and L2 as shown in FIG. 4. The T-coil 404-1T may include a first terminal p1, a second terminal p2, and a center tap terminal ct (e.g., an output stage node). The center tap terminal ct of the T-coil 404-1T may be connected to an output stage's output node op (e.g., the output node op shown in FIGS. 2A and 2B). The center tap terminal ct of the T-coil 404-1T' may be connected to an output stage's output node on (e.g., the output node on shown in FIGS. 2A and 2B). Other portions of an output stage (e.g., transistors or DACs such as 204-1D and 204-2D) are not shown in FIG. 4. The transistors may be located in a layer under the layer of the T-coil on a chip. The transmission lines may have a zig-zag shape as shown in FIG. 4 to be compact on the chip. Each of the T-coils, such as the T-coils 404-1T, 404-2T, 404-1T' and 404-2T', may include a bridge capacitor Cb. In this example implementation, the bridge capacitor Cb is formed coupling of the inductors L1 and L2.

In one or more examples, T-coils may be metal lines or metal wires. T-coils (e.g., 404-1T, 404-2T, 404-1T' or 404-2T') may be formed of the same material as the transmission line (e.g., 408 or 410). In the example shown in FIG. 4, T-coils (e.g., 404-1T, 404-2T, 404-1T' and 404-2T') are placed along the respective transmission line (e.g., 408 or 410). In one or more aspects, because the signal driver 404 is divided into multiple output stages, the capacitance of each of the output stages is relatively small. In one or more examples, the width of each of the inductors (or T-coils) may be 1-10 micrometers, and the length of each of the inductors may be 5 to 20 times the width. Consequently, only a small inductance in the T-coils, such as the T-coil 404-1T, may be needed. Different from other approaches where loops of wires are need for an inductor, only small sections of T-coil such as inductors L1 and L2 may be needed in the present implementation. As shown in FIG. 4, the inductors L1 and L2 form a straight section. The input signals may travel along the transmission line 408 into and out of the inductors L1 and L2 of a T-coil 404-1T of a distributed driver, and continue travel along the transmission line 408 into the next (or adjacent) T-coil.

In FIG. 4, only some portions of the circuit layout are labeled for simplicity. In the circuit layout shown in FIG. 4, some of the patterns repeat, and some of these repeating patterns are not labeled for simplicity. The circuit layout shown in FIG. 4 is an example, and the subject technology is not limited thereto.

Figure 5:
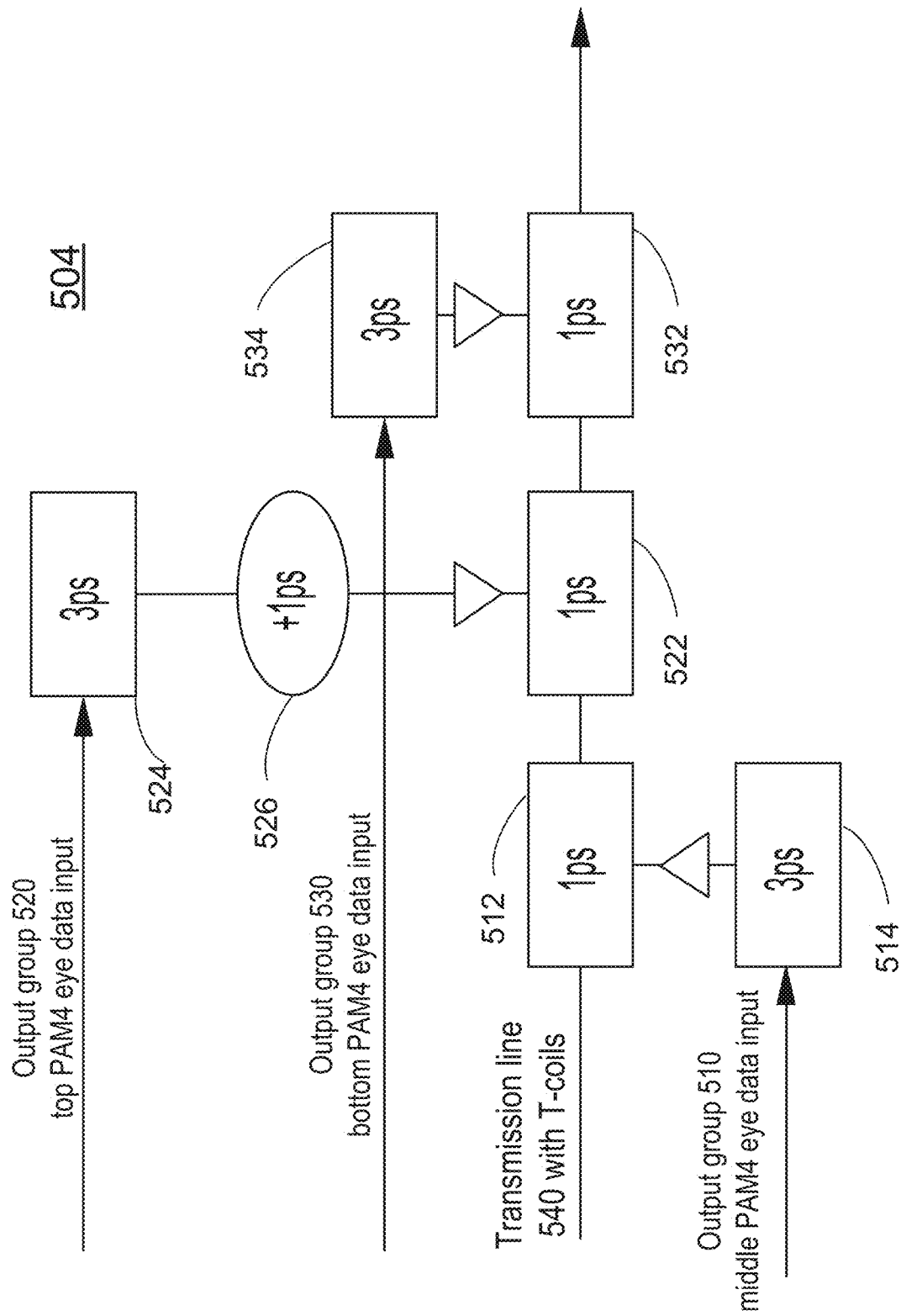
FIG. 5 illustrates a block diagram of an example portion of a signal driver for a pulse amplitude modulation 4-level (PAM4) signal.

FIG. 5 illustrates a block diagram of an example portion of a signal driver 504 for a PAM4 signal.

A pulse amplitude modulation n-level (PAMn) data format may require many output stages for different equalization taps. A pulse amplitude modulation 4-level (PAM4) is a modulation scheme that combines two bits into a single symbol with four levels of amplitude. In contrast, non-return-to-zero (NRZ), which may be sometimes referred to as a pulse amplitude modulation 2-level, is a binary scheme using low and high signal levels to represent the I/O information of a digital signal.

Referring to FIG. 5, for a PAM4 signal, three output groups 510, 520 and 530 may be implemented for the different equalization taps. Each one of the output groups 510, 520 and 530 may process one eye of the three eyes of the PAM4 signal as an NRZ signal with two levels of amplitude. The output group 520 may receive a top PAM4 eye data input. The output group 530 may receive a bottom PAM4 eye data input. The output group 510 may receive a middle PAM4 eye data input. The three output groups 510, 520 and 530 may be summed on a transmission line 540 implemented with T-coils. The transmission line 540 with T-coils may have substantially the same or similar structure, functionality, and connection to a portion of the signal driver 204 in FIGS. 2A and 2B, the signal driver 304 in FIG. 3, or the signal driver 404 in FIG. 4, for example, the portion of the transmission line with T-coils (not including the DACs).

For simplicity, only one transmission line 540 is shown in FIG. 5 which may include two transmission lines for a differential input/output as shown in FIG. 1 (e.g., transmission lines 108 and 110). A PAM4 signal may include four levels of amplitude. Each one of the output groups 510, 520 and 530 may include two levels of amplitude for each eye of PAM4 signal.

The transmission line 540 may include three T-coil output stages 512, 522, and 532. Each of the three T-coil output stages 512, 522, and 532 may be implemented with T-coils without an output tap (for example, the DAC). For example, each of the three T-coil output stages 512, 522, and 532 may be implemented using T-coils (e.g., T-coil 204-1T, T-coil 204-2T, T-coils shown in FIG. 3, T-coil 404-1T, or T-coil 404-1T'). Each of the three T-coil output stages 512, 522, and 532 may take a certain time duration (e.g., 1 picosecond (ps) to process data. In some examples, 1 ps may be a fraction of the time interval between the adjacent signals in the data stream which is determined by the frequency of the data stream. For example, the data processed from an input node to an output node of the T-coil output stage 512 may take a time duration of 1 ps. The data processed between an input node and an output node of the three T-coil output stages 512, 522 and 532 along the transmission line 540 may take a time duration of 3 ps.

FIG. 5 illustrates that delays through the total signal paths (e.g., the total signal paths through the three T-coil output stages 512, 522 and 532) may need to be considered for the summing implementation along the transmission line 540.

The T-coil output stage 512 may be connected to an equalization tap 514 on the output group 510 for processing the middle PAM4 eye data input. The equalization tap 514 may take a time duration of 3 ps to process the middle PAM4 eye data input due to a pre-driver delay. The processed middle PAM4 eye data may then be provided to the T-coil output stage 512 on the transmission line 540 for further summing. In some examples, the equalization tap 514 may include one or more equalization taps.

The T-coil output stage 522 may be connected to an equalization tap 524 on the output group 520 for processing the top PAM4 eye data input. The equalization tap 524 may take a time duration of 3 ps to process the top PAM4 eye data input due to a pre-driver delay. In some examples, there may be an additional delay of 1 ps due to the routing delay by the data connection line 526 to the T-coil output stage 522. This additional delay may be due to a particular circuit layout scheme. For example, on a chip, the output group 520 for processing the top PAM4 eye data input may be placed at a location that is far from the transmission line 540. The processed top PAM4 eye data may then be provided to the T-coil output stage 522 on the transmission line 540 for further summing. In some examples, the equalization tap 524 may include one or more equalization taps.

The T-coil output stage 532 may be connected to an equalization tap 534 on the output group 530 for processing the bottom PAM4 eye data input. The equalization tap 534 may take a time duration of 3 ps to process the bottom PAM4 eye data input due to a pre-driver delay. The processed bottom PAM4 eye data may then be provided to the T-coil output stage 532 on the transmission line 540 for further summing. In some examples, the equalization tap 534 may include one or more equalization taps. Because data signals are delayed when they travel along the transmission line and through the T-coils, the data signals from the equalization taps 514, 524 and 534 may need to be delayed appropriately to synchronize the data signals as they are summed along the transmission line. A final output node (e.g., node 112 or 114 of FIG. 1; or close to node 112 or 114) may receive the summed data signals (e.g., all data signals summed).

In one or more implementations, when the signals (e.g., data signals) from the three equalization taps 514, 524 and 534 are summed along the transmission line 540, the signals may be purposely misaligned so that when the signals reach the load (e.g., 106 of FIG. 1), the signals (or the signal outputs) are lined up. For example, the bottom PAM4 eye data input processed by the T-coil output stage 532 may be advanced by 2 ps compared with the middle PAM4 eye data input processed by the T-coil output stage 512 by design. The 2 ps offset may be utilized to match the inherent delay of a load, for example, a directly modulated laser (DML).

Herein, the delay in the transmission line 540 may be utilized to meet the needs of an example configuration of the load. In some other implementations, the delays in the transmission line 540 and the delays in the equalization taps such as 514, 524 and 534 may be implemented differently, and the subject technology is not limited to the examples provided herein. The delays may be implemented in many different ways for various applications.

FIG. 5 shows a portion of the signal driver 504. In one or more examples, other equalization taps, transmission lines, and/or buffers may be included in the signal driver 504 to process the PAM4 signal.

Compared with other approaches wherein the T-coils are not implemented, the transmission line with T-coil implementation disclosed herein may greatly reduce parasitic capacitance and improve the data transmission bandwidth. In one or more aspects, a transmission line with T-coil implementation may provide improved performance when PAMn data is involved. In other approaches without T-coil implementation, all the output groups, for example 510, 520 and 530, may be summed at the same output node which introduces large parasitic capacitance and degraded performance, in particular, at a high frequency range. In the transmission line with T-coil implementation disclosed herein, for example, as shown in FIG. 5, by distributing the T-coil output stages to receive different output group signals, the large output stage may be split up into smaller output stages. In some examples, one or more T-coils may be included in each of the T-coil output stages in FIG. 5 (substantially similar to the implementation in FIG. 3, and the number of T-coils needed for each of the T-coil output stages may be dependent on the design). The signals from the different T-coil output stages may be summed with a suitable/consistent impedance response for high bandwidth with reduced return loss due to the reduced parasitic capacitance. In some examples, in a high frequency range, the present transmission line implementations with T-coils may achieve a return loss of 30 dB or higher while an implementation without T-coils may result in a return loss of around 12 dB.

In one or more aspects, the present implementation may be utilized when multiple output stages are involved in a signal driver. The multiple output stages may be implemented by DACs to process different bits of a symbol in a bit stream, or by equalization taps/output drivers to process pre-equalization or wave shaping for laser drivers or other drivers. For example, for a laser load, the equalization taps may include a main cursor tap, pre-cursor taps, and post-cursor taps. A DAC may be included in each of the equalization taps to control the output current. For a PAMn signal, output drivers may be implemented for each eye of the PAMn signal.

In one or more examples, each of the output stages/distributed drivers may have the same input signals or different input signals from the transmission line of an incoming signal stream of a signal driver. When T-coils are implemented with DACs, multiple input signal components of the incoming signal stream may be binary weighted by the DACs on the transmission line to generate the final output signal stream of the signal driver. When different output drivers/equalization taps are implemented with DACs, the output drivers/equalization taps may process different versions of the incoming signal stream of the signal driver.

In one or more aspects, a chip may be a semiconductor chip, a circuit chip, an integrated circuit (IC), or an IC chip. In one or more aspects, a signal may include one or more signals. For example, a differential signal may include differential signals. An input signal may include one or more input signals. An output signal may include one or more output signals. An input may sometimes refer to an input signal. An output may sometimes refer to an output signal. An input may include one or more inputs. An output may include one or more outputs. A line may include one or more lines. A transmission line may include one or more transmission lines. In some examples, a node may include one or more nodes. While a supply voltage Vcc is illustrated as a high supply voltage, and the ground is illustrated as a low supply voltage, the subject technology is not limited to thereto. In one or more examples, a supply voltage can be a positive supply voltage, the ground, or a negative supply voltage.

Various example embodiments and aspects of the disclosure are described below for convenience. These are provided as examples, and do not limit the subject technology. Some of the examples described below are illustrated with respect to the figures disclosed herein simply for illustration purposes without limiting the scope of the subject technology.

One or more implementations provide a signal driver (e.g., 104 of FIG. 1, 204 of FIG. 2A or FIG. 2B, 304 of FIG. 3, 404 of FIG. 4, or 504 of FIG. 5). The signal driver comprises: a plurality of distributed drivers (e.g., 204-1, and 204-2 of FIG. 2A) along a first transmission line (e.g., 208 of FIG. 2A). Each of the plurality of the distributed drivers includes: an output tap (e.g., 204-1D of FIG. 2A) configured to receive a portion of an incoming signal of the signal driver; and a first T-coil (e.g., 204-1T of FIG. 2A) connected to a first output node (e.g., op of FIG. 2A) of the output tap. In one or more examples, the first transmission line is connected to and intercepted by a first terminal (e.g., p1 of FIG. 2A) and a second terminal (e.g., p2 of FIG. 2A) of the first T-coil, and a plurality of first T-coils of the plurality of the distributed drivers are distributed along the first transmission line.

In one or more examples, each of the plurality of the first T-coils is configured to transmit an output signal from the corresponding output tap to be summed along the first transmission line.

In one or more examples, each of the plurality of the distributed drivers further comprises: a second T-coil (e.g., 204-1T' of FIG. 2B) connected to a second output node (e.g., on of FIG. 2B) of the output tap. In one or more examples, a second transmission line (e.g., 210 of FIG. 2B) is connected to and intercepted by a first terminal (e.g., p1 of FIG. 2B) and a second terminal (e.g., p2 of FIG. 2B) of the second T-coil, and a plurality of second T-coils of the plurality of the distributed drivers are distributed along the second transmission line.

In one or more examples, the first transmission line and the second transmission line are configured to provide a differential output signal.

In one or more examples, the first T-coil includes: a first inductor (e.g., L1 of FIG. 2A); a second inductor (e.g., L2 of FIG. 2A); and a bridge capacitor (e.g., Cb of FIG. 2A) formed by coupling of the first inductor and the second inductor, and the first inductor is disposed between the first terminal and a center tap terminal (e.g., ct of FIG. 2A) of the first T-coil, and the second inductor is disposed between the second terminal and the center tap terminal of the first T-coil.

In one or more examples, the output tap is a digital to analog converter (DAC).

In one or more examples, the output tap is an equalization tap.

In one or more examples, the plurality of distributed drivers includes a first distributed driver (e.g., 304-1 of FIG. 3) and a second distributed driver (e.g., 304-2 of FIG. 3). In one or more examples, an inductance of the first inductor of the first distributed driver is different from an inductance of the first inductor of the second distributed driver; an inductance of the second inductor of the first distributed driver is different from an inductance of the second inductor of the second distributed driver; a capacitance of the bridge capacitor of the first distributed driver is different from a capacitance of the bridge capacitor of the second distributed driver; and the first distributed driver is configured to receive a first portion of the incoming signal of the signal driver, and the second distributed driver is configured to receive a second portion of the incoming signal of the signal driver.

In one or more examples, the plurality of distributed drivers further includes a third distributed driver (e.g., 304-5 of FIG. 3) and a fourth distributed driver (e.g., 304-6 of FIG. 3). In one or more examples, an inductance of the first inductor of the third distributed driver is the same as an inductance the first inductor of the fourth distributed driver; an inductance of the second inductor of the third distributed driver is the same as an inductance of the second inductor of the fourth distributed driver; a capacitance of the bridge capacitor of the third distributed driver is the same as a capacitance of the bridge capacitor of the fourth distributed driver; and each of the third distributed driver and the fourth distributed driver is configured to receive a same portion of the incoming signal of the signal driver.

In one or more examples, the incoming signal of the signal driver comprises a first bit, a second bit and a third bit; the first distributed driver is configured to process the first bit; the second distributed driver is configured to process the second bit; and the third distributed driver is configured to process the third bit.

In one or more examples, the incoming signal is in a pulse amplitude modulation n-level (PAMn) format, and a plurality of output taps (e.g., 514, 524, and 534 of FIG. 5) of the plurality of distributed drivers are organized into n−1 output groups (e.g., 510, 520, and 530 of FIG. 5) for n−1 eyes of the incoming signal, wherein n is a positive integer. In one or more examples, the plurality of the first T-coils of the plurality of the distributed drivers are organized into n−1 segments (e.g., 512, 522, and 532 of FIG. 5) along the first transmission line, and each of the n−1 segments is connected to each of the n−1 output groups; and an order of the plurality of the first T-coils along the first transmission line is configured to be determined based on a delay scheme of portions of the incoming signal from the plurality of output taps.

In one or more examples, an inductance of the first inductor is substantially equal to an inductance of the second inductor.

One or more implementations provide a signal driver (e.g., 104 of FIG. 1, 204 of FIG. 2A or FIG. 2B, 304 of FIG. 3, 404 of FIG. 4, or 504 of FIG. 5). The signal driver comprises: a first distributed driver (e.g., 204-1 of FIG. 2A, or 304-1 of FIG. 3) and a second distributed driver (e.g., 204-2 of FIG. 2A, or 304-2 of FIG. 3) along a first transmission line. Each of the first distributed driver and the second distributed driver includes: an output tap (e.g., 204-1D of FIG. 2A) configured to receive a portion of an incoming signal of the signal driver; and a first T-coil (e.g., 204-1T of FIG. 2A) connected to a first output node (e.g., op of FIG. 2A) of the output tap through a central tap terminal (e.g., ct of FIG. 2A) between a first inductor and a second inductor of the first T-coil, wherein a bridge capacitor (e.g., Cb of FIG. 2A) is formed by the first inductor and the second inductor. In one or more examples, the first transmission line (e.g., 208 of FIG. 2A) is connected to and intercepted by a first terminal (e.g., p1 of FIG. 2A) and a second terminal (e.g., p2 of FIG. 2A) of the first T-coil, and the first T-coil of the first distributed driver and the first T-coil of the second distributed driver are spaced apart along the first transmission line for summing portions of the incoming signal.

In one or more examples, each of the first distributed driver and the second distributed driver further comprises: a second T-coil (e.g., 204-1T' of FIG. 2B) connected to a second output node (e.g., on of FIG. 2B) of the output tap. In one or more examples, a second transmission line (e.g., 210 of FIG. 2B) is connected to and intercepted by a first terminal (e.g., p1 of FIG. 2B) and a second terminal (e.g., p2 of FIG. 2B) of the second T-coil, and the second T-coil of the first distributed driver and the second T-coil of the second distributed driver are spaced apart along the second transmission line for summing portions of the incoming signal.

In one or more examples, the first inductor is between the first terminal and the center tap terminal of the first T-coil, and the second inductor is between the second terminal and the center tap terminal of the first T-coil.

In one or more examples, the output tap is a digital to analog converter (DAC) or an equalization tap.

In one or more examples, an inductance of the first inductor of the first distributed driver is different from an inductance of the first inductor of the second distributed driver; an inductance of the second inductor of the first distributed driver is different from an inductance of the second inductor of the second distributed driver; a capacitance of the bridge capacitor of the first distributed driver is different from a capacitance of the bridge capacitor of the second distributed driver; and the first distributed driver is configured to receive a first portion of the incoming signal of the signal driver, and the second distributed driver is configured to receive a second portion of the incoming signal of the signal driver.

In one or more examples, the signal driver further includes a third distributed driver (e.g., 304-5 of FIG. 3) and a fourth distributed driver (e.g., 304-6 of FIG. 3). In one or more examples, an inductance of the first inductor of the third distributed driver is the same as an inductance of the first inductor of the fourth distributed driver; an inductance of the second inductor of the third distributed driver is the same as an inductance of the second inductor of the fourth distributed driver; a capacitance of the bridge capacitor of the third distributed driver is the same as a capacitance of the bridge capacitor of the fourth distributed driver; and each of the third distributed driver and the fourth distributed driver is configured to receive a same portion of the incoming signal of the signal driver.

In one or more examples, an inductance of the first inductor is substantially equal to an inductance of the second inductor.

One or more implementations provide a method of providing a signal driver (e.g., 104 of FIG. 1, 204 of FIG. 2A or FIG. 2B, 304 of FIG. 3, 404 of FIG. 4, or 504 of FIG. 5). The method includes: providing a differential transmission line (e.g., 108 and 110 of FIG. 1, or 208 and 210 of FIG. 2B); providing a plurality of distributed drivers (e.g., 204-1, and 204-2 of FIG. 2A) along the differential transmission line; and summing portions of the incoming signal along the differential transmission line using the T-coil (e.g., 204-1T of FIG. 2A) of each of the plurality of the distributed drivers. In one or more examples, providing the plurality of the distributed drivers includes: configuring an output tap (e.g., 204-1D of FIG. 2A) of each of the plurality of the distributed drivers to receive a portion of an incoming signal of the signal driver; connecting the T-coil to a first output node (e.g., op of FIG. 2A) of the output tap; and integrating the T-coil of each of the plurality of the distributed drivers into the differential transmission line in a sequence connection.

In one or more aspects, a method includes one or more methods, operations or portions thereof described herein. In one or more aspects, an apparatus includes one or more memories and one or more processors, the one or more processors configured to cause performing one or more methods, operations or portions thereof described herein. In one or more aspects, an apparatus includes means adapted for performing one or more methods, operations or portions thereof described herein. In one or more aspects, a hardware apparatus includes circuits configured to perform one or more methods, operations or portions thereof described herein. In one or more aspects, an apparatus includes components operable to carry out one or more methods, operations or portions thereof described herein. In one or more aspects, anon-transitory machine-readable storage medium (e.g., one or more memories and/or one or more registers) store instructions that, when executed by one or more processors, cause one or more processors to perform one or more methods, operations or portions thereof described herein.

Further examples of the subject technology include various subsets of the above examples combined or otherwise re-arranged in various forms.

In some examples, to illustrate the interchangeability of hardware and software, items such as the various illustrative blocks, modules, components, methods, operations, instructions, and algorithms may have been described generally in terms of their functionality. In some examples, whether such functionality is implemented as hardware, software or a combination of hardware and software depends upon the particular application and design constraints imposed on the overall system. Skilled artisans may implement the described functionality in varying ways for each particular application.

Headings and subheadings, if any, are used for convenience only and do not limit the invention. The word "exemplary" is used to mean serving as an example or illustration. Any implementation described herein as an "example" is not necessarily to be construed as preferred or advantageous over other implementations. Relational terms such as first and second and the like may be used simply for ease of understanding without necessarily requiring or implying any actual relationship or order between elements or actions and without necessarily requiring or implying that they have different characteristics unless stated otherwise.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" and "at least one of A, B, or C" may refer to only A, only B, or only C; any combination of A, B, and C; and/or at least one of each of A, B, and C.

The expression of a first element, a second elements "and/or" a third element should be understood as one of the first, second and third elements or as any or all combinations of the first, second and third elements. By way of example, A, B and/or C can refer to only A; only B; only C; any or some combination of A, B, and C; or all of A, B, and C. Furthermore, an expression "element A/element B" may be understood as element A and/or element B.

Features of various embodiments of the present disclosure may be partially or wholly coupled to or combined with each other and may be variously inter-operated, linked or driven together. The embodiments of the present disclosure may be carried out independently from each other or may be carried out together in a co-dependent or related relationship. In one or more aspects, the components of each apparatus according to various embodiments of the present disclosure are operatively coupled and configured.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

In one aspect, the blocks or components described in this present disclosure may be implemented in circuits or integrated circuits. A circuit or an integrated circuit may include one or more transistors.

In one or more aspects, a transistor may include one or more bipolar junction transistors (BJTs), which may refer to any of a variety of multi-terminal transistors operating on the principal of carrying current using both electrons and holes, including, but not limited to, an n-p-n BJT (NPN BJT) and a p-n-p BJT (PNP BJT).

In one or more aspects, transistors may include one or more field effect transistors (FETs), which may refer to any of a variety of multi-terminal transistors operating on the principals of controlling an electric field to control the shape and hence the conductivity of a channel of one type of charge carrier in a semiconductor material, including, but not limited to, a metal oxide semiconductor field effect transistor (MOSFET), a junction FET (JFET), a metal semiconductor FET (MESFET), a high electron mobility transistor (HEMT), a modulation doped FET (MODFET), an insulated gate bipolar transistor (IGBT), a fast reverse epitaxial diode FET (FREDFET), and an ion-sensitive FET (ISFET). A MOSFET may be an n-type MOSFET (NMOS) or a p-type MOSFET (PMOS). A complementary metal-oxide semiconductor (CMOS) device may include an NMOS and a PMOS.

In one or more aspects, transistors may include one or more BJTs and FETs. In one or more examples, transistors may include one or more BJTs and one or more CMOS devices, which may be referred to as Bi-CMOS devices.

Unless otherwise mentioned, various configurations described in the present disclosure may be implemented on a silicon, silicon-germanium (SiGe), gallium arsenide (GaAs), indium phosphide (InP) or indium gallium phosphide (InGaP) substrate, or any other suitable substrate.

In one aspect, the terms base, emitter, and collector may refer to three terminals of a transistor and may refer to a base, an emitter and a collector of a bipolar junction transistor or may refer to a gate, a source, and a drain of a field effect transistor, respectively, and vice versa. In another aspect, the terms gate, source, and drain may refer to base, emitter, and collector of a transistor, respectively, and vice versa. In some aspects, a source and a drain may be used interchangeably.

The transistors implemented herein are not limited thereto. In one or more examples, the transistors may include other types such as FETs and/or some combination of BJTs and FETs. Furthermore, in one or more examples, the transistors may include various types such as NPN BJTs, PNP BJTs, some types of FETs (e.g., NMOS or PMOS) and/or some combination thereof.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In describing a temporal relationship, when the temporal order is described as, for example, "after," "subsequent," "next," "before," "preceding," "prior to," or the like, a case that is not consecutive or not sequential may be included unless a more limiting term, such as "just," "immediate(ly)," or "direct(ly)," is used.

It is understood that, although the term "first," "second," or the like may be used herein to describe various elements, these elements should not be limited by these terms. These terms are only used to distinguish one element from another. For example, a first element could be a second element, and, similarly, a second element could be a first element, without departing from the scope of the present disclosure. Furthermore, the first element, the second element, and the like may be arbitrarily named according to the convenience of those skilled in the art without departing from the scope of the present disclosure.

In describing elements of the present disclosure, the terms "first," "second," "A," "B," "(a)," "(b)," or the like may be used. These terms are intended to identify the corresponding element(s) from the other element(s), and these are not used to define the essence, basis, order, or number of the elements.

In one or more examples, when an element is "connected" or "coupled" to another element, the element can be directly connected or coupled to another element, and can be indirectly connected or coupled to another element with one or more intervening elements disposed or interposed between the elements, unless otherwise specified.

The disclosure is provided to enable any person skilled in the art to practice the various aspects described herein. In some instances, when a detailed description of well-known functions or configurations may unnecessarily obscure aspects of the present disclosure, the detailed description thereof may have been omitted. The disclosure provides various examples of the subject technology, and the subject technology is not limited to these examples. Various modifications to these aspects will be readily apparent to those skilled in the art, and the principles described herein may be applied to other aspects.

Unless stated otherwise, like reference numerals refer to like elements throughout even when they are shown in different drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

When the term "comprise," "have," "include," "contain," "constitute," or the like is used, one or more other elements may be added unless a term such as "only" or the like is used. The terms used in the present disclosure are merely used in order to describe particular embodiments, and are not intended to limit the scope of the present disclosure. The terms used herein are merely used in order to describe example embodiments, and are not intended to limit the scope of the present disclosure. The terms of a singular form may include plural forms unless the context clearly indicates otherwise. An element proceeded by "a," "an," "the," or "said" does not, without further constraints, preclude the existence of additional elements.

In one or more aspects, an element, feature, or corresponding information (e.g., a level, range, dimension, size, or the like) is construed as including an error or tolerance range even where no explicit description of such an error or tolerance range is provided. An error or tolerance range may be caused by various factors (e.g., process factors, internal or external impact, or the like). Furthermore, while the subject disclosure may provide many example ranges and values, these are non-limiting examples, and other ranges and values are within the scope of the subject technology.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A signal driver, comprising:
a plurality of distributed drivers along a first transmission line, each of the plurality of the distributed drivers comprising:
an output tap configured to receive a portion of an incoming signal of the signal driver; and
a first T-coil connected to a first output node of the output tap,
wherein the first transmission line is connected to and intercepted by a first terminal and a second terminal of the first T-coil, and
wherein a plurality of first T-coils of the plurality of the distributed drivers are distributed along the first transmission line.

2. The signal driver according to claim 1, wherein each of the plurality of the first T-coils is configured to transmit an output signal from the corresponding output tap to be summed along the first transmission line.

3. The signal driver according to claim 1, wherein each of the plurality of the distributed drivers further comprises:
a second T-coil connected to a second output node of the output tap,
wherein a second transmission line is connected to and intercepted by a first terminal and a second terminal of the second T-coil, and
wherein a plurality of second T-coils of the plurality of the distributed drivers are distributed along the second transmission line.

4. The signal driver according to claim 3, wherein the first transmission line and the second transmission line are configured to provide a differential output signal.

5. The signal driver according to claim 1,
wherein the first T-coil includes:
a first inductor;
a second inductor; and
a bridge capacitor formed by coupling of the first inductor and the second inductor, and
wherein the first inductor is disposed between the first terminal and a center tap terminal of the first T-coil, and the second inductor is disposed between the second terminal and the center tap terminal of the first T-coil.

6. The signal driver according to claim 5, wherein the plurality of distributed drivers includes a first distributed driver and a second distributed driver,
wherein:
an inductance of the first inductor of the first distributed driver is different from an inductance of the first inductor of the second distributed driver;
an inductance of the second inductor of the first distributed driver is different from an inductance of the second inductor of the second distributed driver;
a capacitance of the bridge capacitor of the first distributed driver is different from a capacitance of the bridge capacitor of the second distributed driver; and
the first distributed driver is configured to receive a first portion of the incoming signal of the signal driver, and the second distributed driver is configured to receive a second portion of the incoming signal of the signal driver.

7. The signal driver according to claim 6, wherein the plurality of distributed drivers further includes a third distributed driver and a fourth distributed driver,
wherein:
an inductance of the first inductor of the third distributed driver is the same as an inductance the first inductor of the fourth distributed driver;
an inductance of the second inductor of the third distributed driver is the same as an inductance of the second inductor of the fourth distributed driver;
a capacitance of the bridge capacitor of the third distributed driver is the same as a capacitance of the bridge capacitor of the fourth distributed driver; and
each of the third distributed driver and the fourth distributed driver is configured to receive a same portion of the incoming signal of the signal driver.

8. The signal driver according to claim 7, wherein:
the incoming signal of the signal driver comprises a first bit, a second bit and a third bit;
the first distributed driver is configured to process the first bit;
the second distributed driver is configured to process the second bit; and
the third distributed driver is configured to process the third bit.

9. The signal driver according to claim 5, wherein an inductance of the first inductor is substantially equal to an inductance of the second inductor.

10. The signal driver according to claim 1, wherein the output tap is a digital to analog converter (DAC).

11. The signal driver according to claim 1, wherein the output tap is an equalization tap.

12. The signal driver according to claim 1, wherein the incoming signal is in a pulse amplitude modulation n-level (PAMn) format, and a plurality of output taps of the plurality of distributed drivers are organized into n−1 output groups for n−1 eyes of the incoming signal, wherein n is a positive integer,
wherein:
the plurality of the first T-coils of the plurality of the distributed drivers are organized into n−1 segments along the first transmission line, and each of the n−1 segments is connected to each of the n−1 output groups; and
an order of the plurality of the first T-coils along the first transmission line is configured to be determined based on a delay scheme of portions of the incoming signal from the plurality of output taps.

13. A signal driver, comprising:
a first distributed driver and a second distributed driver along a first transmission line, each of the first distributed driver and the second distributed driver comprising:
an output tap configured to receive a portion of an incoming signal of the signal driver; and
a first T-coil connected to a first output node of the output tap through a central tap terminal between a first inductor and a second inductor of the first T-coil, wherein a bridge capacitor is formed by the first inductor and the second inductor,
wherein the first transmission line is connected to and intercepted by a first terminal and a second terminal of the first T-coil, and
wherein the first T-coil of the first distributed driver and the first T-coil of the second distributed driver are spaced apart along the first transmission line for summing portions of the incoming signal.

14. The signal driver according to claim 13, wherein each of the first distributed driver and the second distributed driver further comprises:
a second T-coil connected to a second output node of the output tap, wherein a second transmission line is connected to and intercepted by a first terminal and a second terminal of the second T-coil, and wherein the second T-coil of the first distributed driver and the second T-coil of the second distributed driver are spaced apart along the second transmission line for summing portions of the incoming signal.

15. The signal driver according to claim 13, wherein the first inductor is between the first terminal and the center tap terminal of the first T-coil, and the second inductor is between the second terminal and the center tap terminal of the first T-coil.

16. The signal driver according to claim 13, wherein the output tap is a digital to analog converter (DAC) or an equalization tap.

17. The signal driver according to claim 13, wherein:

an inductance of the first inductor of the first distributed driver is different from an inductance of the first inductor of the second distributed driver;

an inductance of the second inductor of the first distributed driver is different from an inductance of the second inductor of the second distributed driver;

a capacitance of the bridge capacitor of the first distributed driver is different from a capacitance of the bridge capacitor of the second distributed driver; and the first distributed driver is configured to receive a first portion of the incoming signal of the signal driver, and the second distributed driver is configured to receive a second portion of the incoming signal of the signal driver.

18. The signal driver according to claim 17, wherein the signal driver further includes a third distributed driver and a fourth distributed driver, wherein:

an inductance of the first inductor of the third distributed driver is the same as an inductance of the first inductor of the fourth distributed driver;

an inductance of the second inductor of the third distributed driver is the same as an inductance of the second inductor of the fourth distributed driver;

a capacitance of the bridge capacitor of the third distributed driver is the same as a capacitance of the bridge capacitor of the fourth distributed driver; and each of the third distributed driver and the fourth distributed driver is configured to receive a same portion of the incoming signal of the signal driver.

19. The signal driver according to claim 13, wherein an inductance of the first inductor is substantially equal to an inductance of the second inductor.

20. A method of providing a signal driver, comprising:

providing a differential transmission line;

providing a plurality of distributed drivers along the differential transmission line, wherein providing the plurality of the distributed drivers includes:

configuring an output tap of each of the plurality of the distributed drivers to receive a portion of an incoming signal of the signal driver;

connecting a T-coil to a first output node of the output tap; and integrating the T-coil of each of the plurality of the distributed drivers into the differential transmission line in a sequence connection; and summing portions of the incoming signal along the differential transmission line using the T-coil of each of the plurality of the distributed drivers.

* * * * *